US012778096B2

(12) United States Patent
Povich

(10) Patent No.: US 12,778,096 B2
(45) Date of Patent: Nov. 3, 2026

(54) ROLLER GUIDE SYSTEM FOR ADAPTABLY HOLDING A FISHING LINE IN PLACE WHEN PLACED UNDER LOAD

(71) Applicant: Carbon Fishing, LLC, Bigfork, MT (US)

(72) Inventor: Matthew Povich, Bigfork, MT (US)

( * ) Notice: Subject to any disclaimer, the term of this patent is extended or adjusted under 35 U.S.C. 154(b) by 0 days.

(21) Appl. No.: 19/088,605

(22) Filed: Mar. 24, 2025

(65) Prior Publication Data

US 2026/0283128 A1 Sep. 24, 2026

(51) Int. Cl.
*A01K 87/04* (2006.01)

(52) U.S. Cl.
CPC .................................... *A01K 87/04* (2013.01)

(58) Field of Classification Search
CPC .... A01K 87/04; A01K 87/008; A01K 87/009; A01K 89/01127; A01K 89/015; A01K 89/01931; A01K 89/01081; A01K 89/01082; A01K 89/01142; A01K 89/01913; B66D 3/04; B65H 57/26; B65H 57/14
USPC .............................................................. 43/24
See application file for complete search history.

(56) References Cited

U.S. PATENT DOCUMENTS 2,630,977 A * 3/1953 Maury ............... A01K 89/0186 185/39
2,878,609 A * 3/1959 O'Brien, Jr. ........... A01K 87/04 43/24
3,315,400 A * 4/1967 Axelson ................. A01K 87/04 D22/142
3,350,809 A * 11/1967 Chion .................... A01K 87/04 43/24
4,428,141 A * 1/1984 Kovalovsky ........... A01K 87/04 254/416
5,531,041 A * 7/1996 Betto ..................... A01K 87/04 43/24
2006/0090388 A1 * 5/2006 Lee ........................ A01K 87/04 43/24
2019/0159438 A1 * 5/2019 Stirling .................. A01K 87/04

FOREIGN PATENT DOCUMENTS

FR 1116582 A * 5/1956
WO WO-2018131006 A1 * 7/2018 ............. A01K 87/04

* cited by examiner

*Primary Examiner* — Katelyn T Truong

(57) ABSTRACT

A roller guide system for fishing poles that adaptively holds a fishing line in place when the pole flexes under load. The system includes a roller housing with circular openings, a roller holder with oval-shaped openings configured to move within the housing, and a roller unit mounted through both openings. The roller unit comprises a spool with a center channel, roller caps with flanges, a center insert, and an axel secured with screws to allow free spinning. The oval-shaped openings permit limited movement of the roller holder relative to the housing during flexion, preventing structural failure under strain. Certain embodiments include dual roller units within a single guide for improved line height control near the pole handle. The design enhances durability and performance by allowing controlled component movement while maintaining fixed attachment to the fishing rod.

11 Claims, 11 Drawing Sheets

ROLLER GUIDE SYSTEM FOR ADAPTABLY HOLDING A FISHING LINE IN PLACE WHEN PLACED UNDER LOAD

BACKGROUND

Existing roller guide systems are prone to breakage when regularly put under the sort of load typical for fishing poles, particularly in the context of deep see fishing where large heavy loads from fish are typical. Thus, there is a need for a new and improved roller guide system that minimizes breakage by being designed to permit movement of key components when a fishing pole flexes under load while maintaining the strength and durability required for such fishing poles.

SUMMARY OF THE INVENTION

To be inserted once claims are finalized

DETAILED DESCRIPTION

Figure 1A:
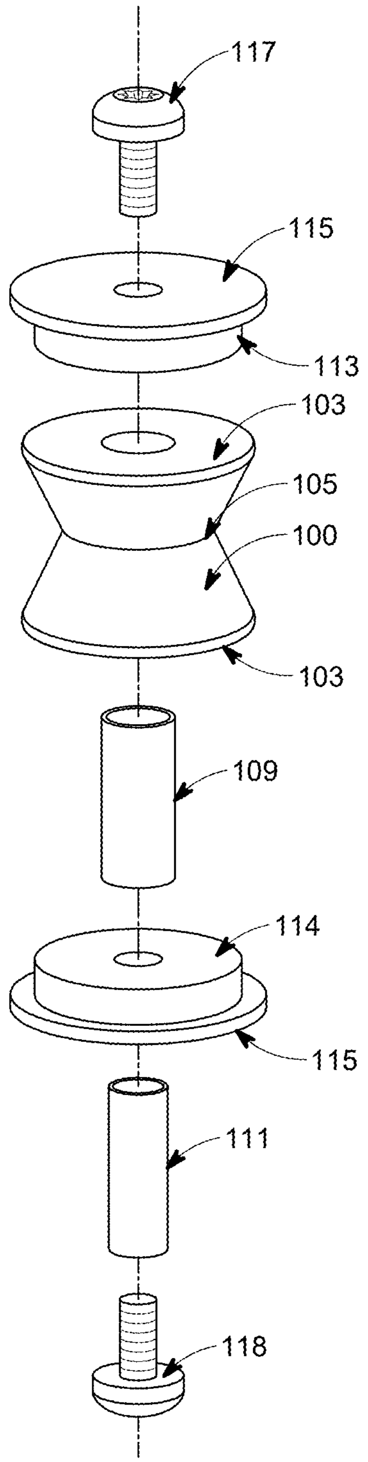
FIG. 1*a* illustrates a roller spool configured in accordance with one or more embodiments of the invention.

A roller guide system for adaptably keeping a fishing line in place on a fishing pole when the pole flexes under load is described. The roller guide assembly is designed to permit key components to move when load is applied to the pole. The allows the roller guide assembly to remain durably and fixedly attached to the pole when the pole is under strain.

In the following exemplary description numerous specific details are set forth to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term “first”, “second” and the like, herein do not denote any order, quantity or importance, but rather are used to distinguish one element from another, and the terms “a” and “an” herein do not denote a limitation of quantity, but rather denote the presence of at least one of the referenced items.

Spatially relative terms, such as “beneath,” “below,” “lower,” “under,” “above,” “upper,” and the like, may be used herein for ease of explanation to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as “below” or “beneath” or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being “on,” “connected to,” or “coupled to” another element or layer, it can be directly on, connected to, or coupled to the other element or layer, or one or more intervening elements or layers may be present. In addition, it will also be understood that when an element or layer is referred to as being “between” two elements or layers, it can be the only element or layer between the two elements or layers, or one or more intervening elements or layers may also be present.

As used herein, the term “substantially,” “about,” and similar terms are used as terms of approximation and not as terms of degree, and are intended to account for the inherent deviations in measured or calculated values that would be recognized by those of ordinary skill in the art. Further, the use of “may” when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
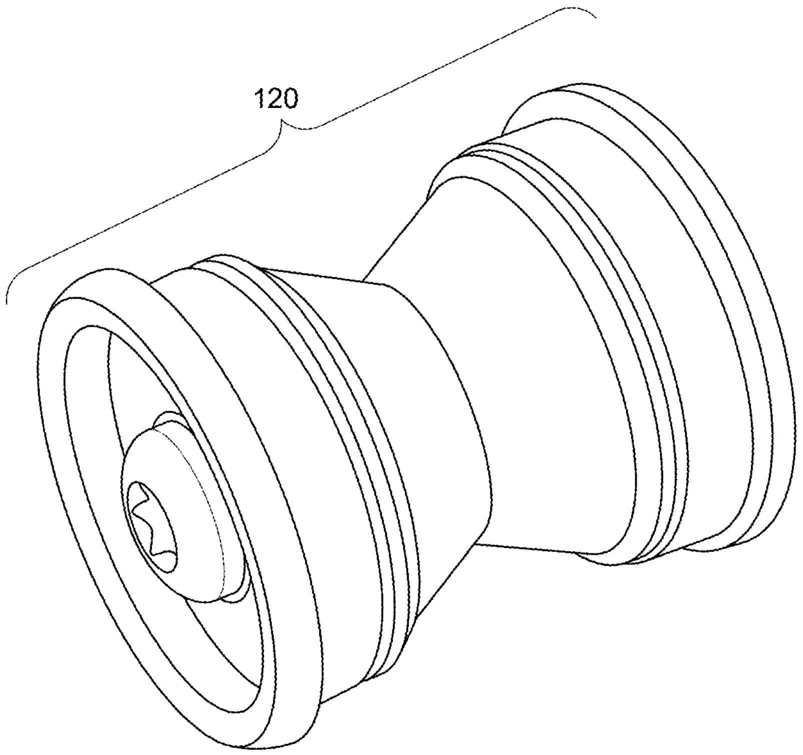
FIG. 1*b* illustrates the roller unit assembled from the various components. The roller spool and roller caps and can spin freely on the center insert which is secured in place by the axel screws.

FIG. 1*a* illustrates a roller spool configured in accordance with one or more embodiments of the invention. The roller spool 100 has circular ends 103 and tapers towards a center channel 105 designed to hold fishing line within this center channel 105. The roller spool 100 contains a lateral center hole 107 which protrudes through the roller spool 100. A center insert 109 extends into the lateral center hole 108 and a roller axel 111 is inserted into the center insert 109. Circular roller caps 113 and 114 with center holes sit on each end of the roller spool 100. The roller axel 111 extends through center insert 109, the roller spool 100 and the circular roller caps 113 and 114 to makeup a roller unit 120. Axel screws 117 and 118 screws into roller axel 111 to prevent the components of the roller unit from separating. The assembled roller unit is made up of each of the components depicted in FIG. 1*a* namely the roller spool 100, center insert 109, roller axel 111, circular roller caps 113 and the axel screws 117 and 118. The circular roller caps 113 each have a cap flange 115 that flares out wider than the roller cap itself. This cap flange 115 enables the roller unit to sit within the openings for a roller holder opening and roller housing openings discussed in further detail below. FIG. 1*b* illustrates the roller unit 120 assembled from the various components. The roller spool 100 and roller caps 113 and 114 can spin freely on the center insert 109 which is secured in place by the axel screws 117 and 118. Other roller unit configurations are possible and remain within the scope and spirit of the invention described herein. The numerous components of the roller unit may, for example be combined or secured together without diverging from the concepts set forth herein.

Figure 2A:
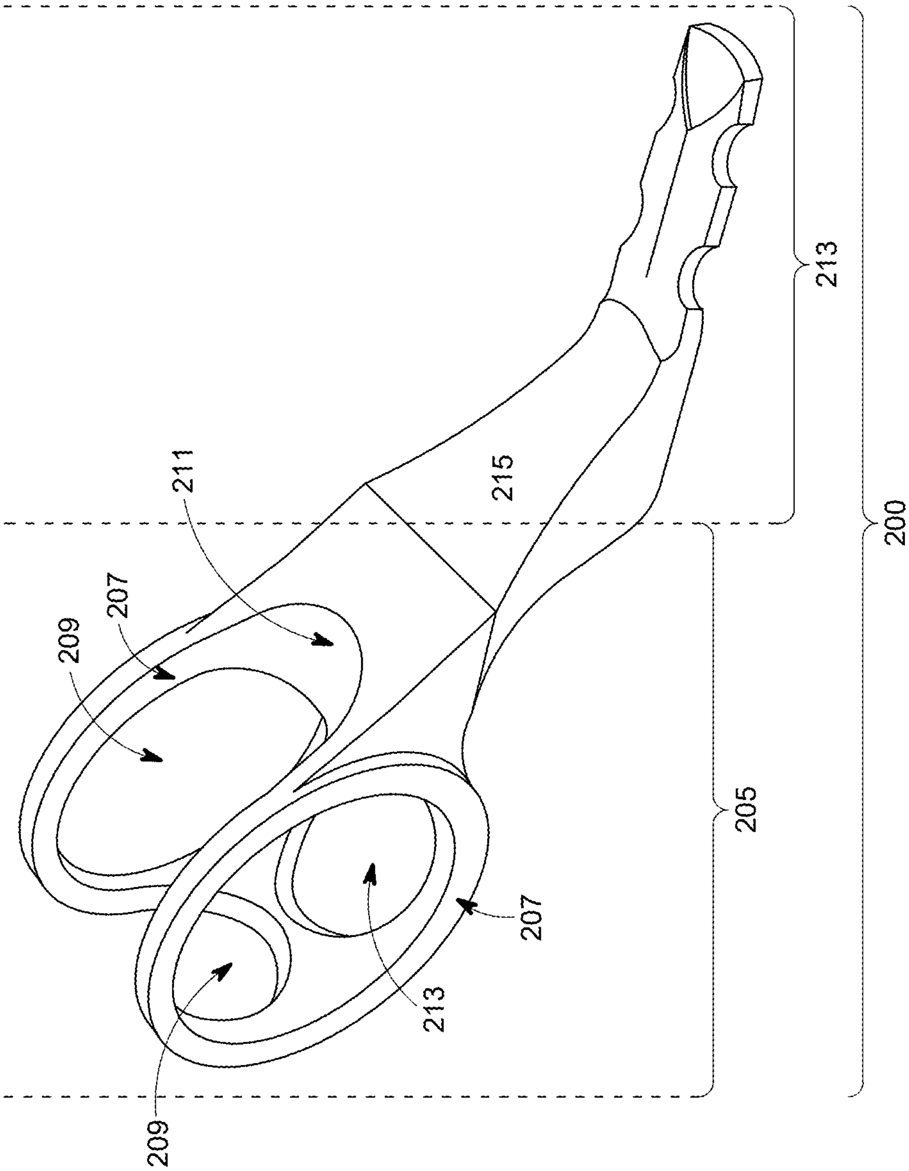
FIG. 2*a* illustrates a roller holder configured to hold the assembled roller unit in accordance with one or more embodiments of the invention.

FIG. 2*a* illustrates a roller holder 200 configured to hold the assembled roller unit in accordance with one or more embodiments of the invention. The roller holder 200 has an end 205 with side walls 207 having oval shaped side openings 209 and an open cradle top 211. An open bottom 213 is optionally added to the roller holder 200 to enable access to the bottom portion of the roller unit when the roller unit is placed within the open cradle top 209. The roller holder 200 also contains a roller guide foot portion 213 containing a foot for anchoring the roller holder 200 to a fishing rod. The end 205 and foot portion 213 are joined together via a connecting element 215 that makes the roller holder 200 into a component of the roller guide system.

Figure 2B:
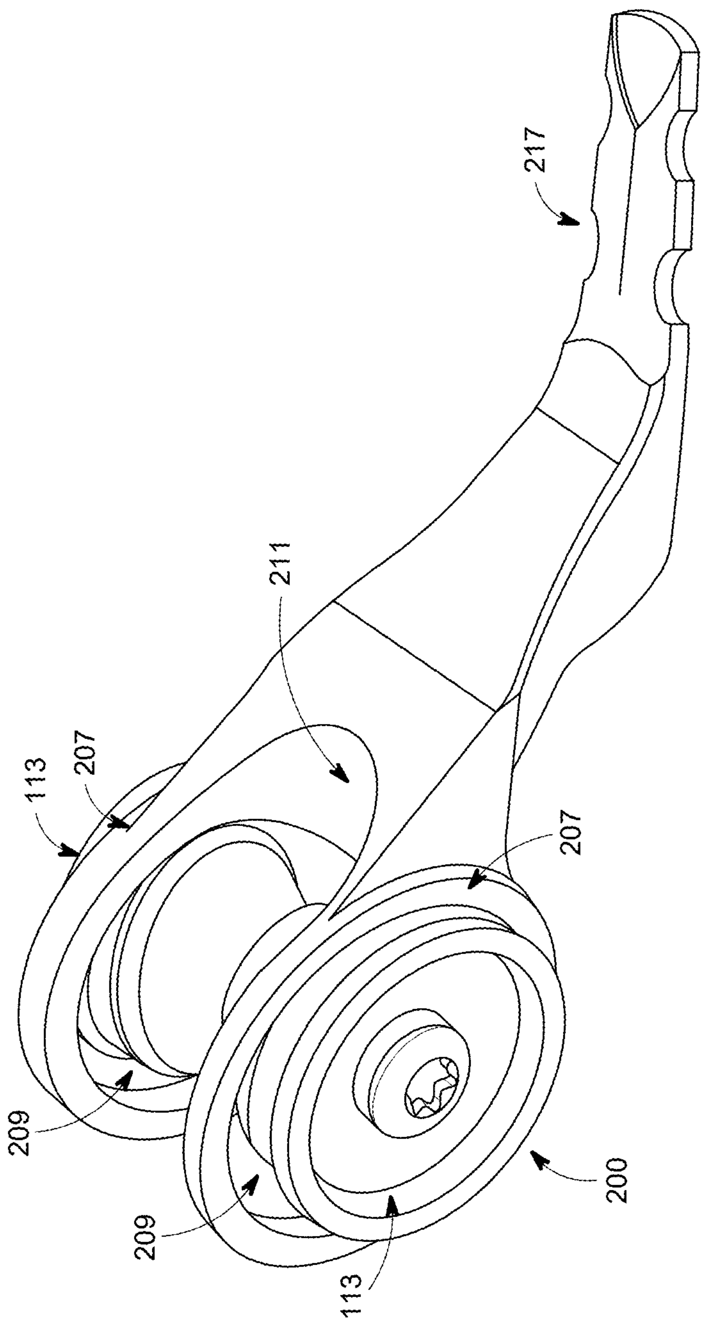
FIG. 2*b* illustrates the roller holder holding the roller unit within the open cradle top as it is configured in accordance with one or more embodiments of the invention.

FIG. 2*b* illustrates the roller holder 200 holding the roller unit within the open cradle top 211 as it is configured in accordance with one or more embodiments of the invention. The circular roller caps 113 of the roller unit fit within the oval shaped side openings 209 of the side walls 207. The roller caps which are connected to the roller spool fit loosely within the oval shaped side openings. This configuration permits movement of the roller unit within the side openings when the fishing pole flexes during usage. The roller holder 200 has a footing element 217 that enables the roller holder to be attached to a fishing pole during use.

Figure 3A:
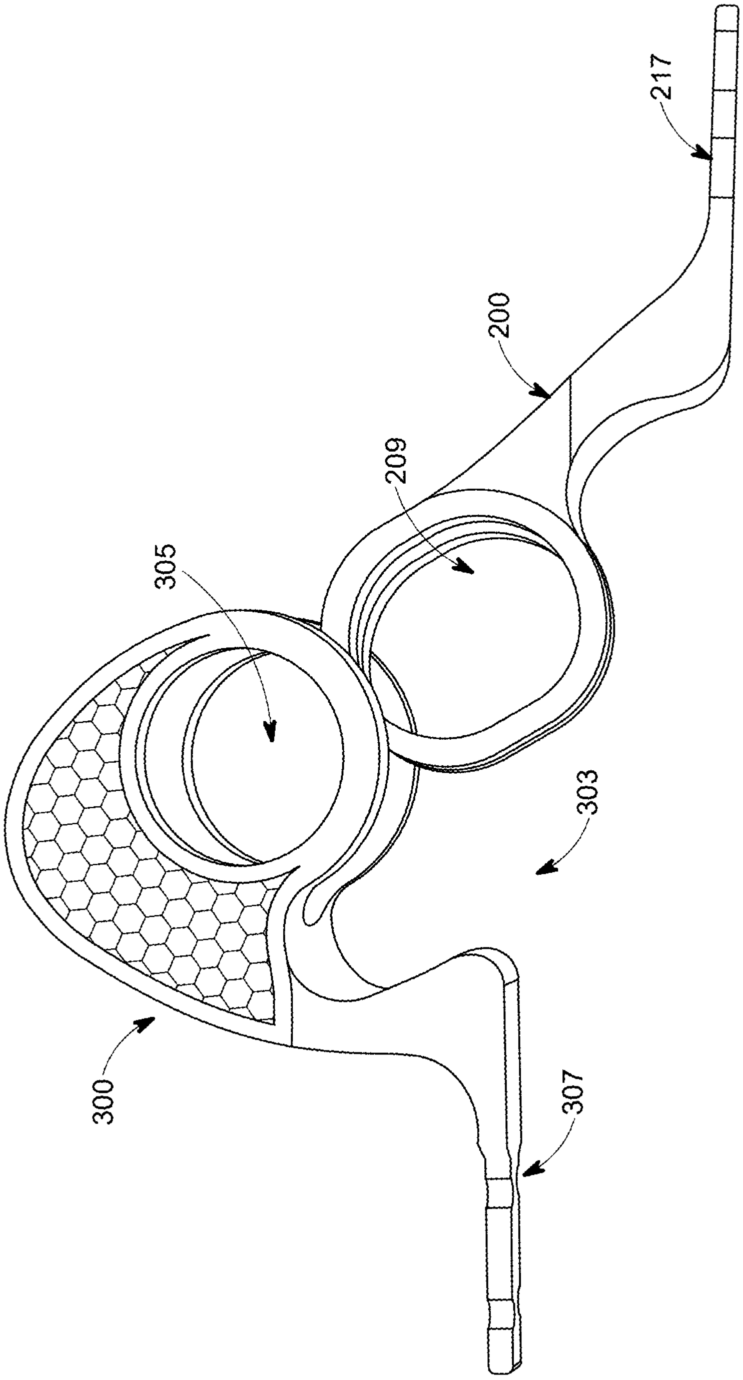
FIG. 3*a* illustrates how the roller holder inserts into a roller housing in accordance with one or more embodiments of the invention.

FIG. 3*a* illustrates how the roller holder 200 inserts into a roller housing 300 in accordance with one or more embodiments of the invention. The roller holder is configured to slide into the roller housing 300 in the direction indicated by arrow 303. The roller housing contains circular openings 305 on each side of the housing and the roller holder has oval shaped side openings 209. When the roller unit is inserted into the assembly as discussed in further detail below the roller holder sits loosely around the roller unit thereby allowing the roller holder to move as needed when the fishing rod to which the roller guide assembly is attached upon flexes. The roller housing has a housing foot 307 which extends out from the housing to provide a footing for anchoring the roller housing to the fishing rod itself. For example, the housing foot may be wrapped with high-strength string and taped to secure the roller housing to the fishing rod.

Figure 3B:
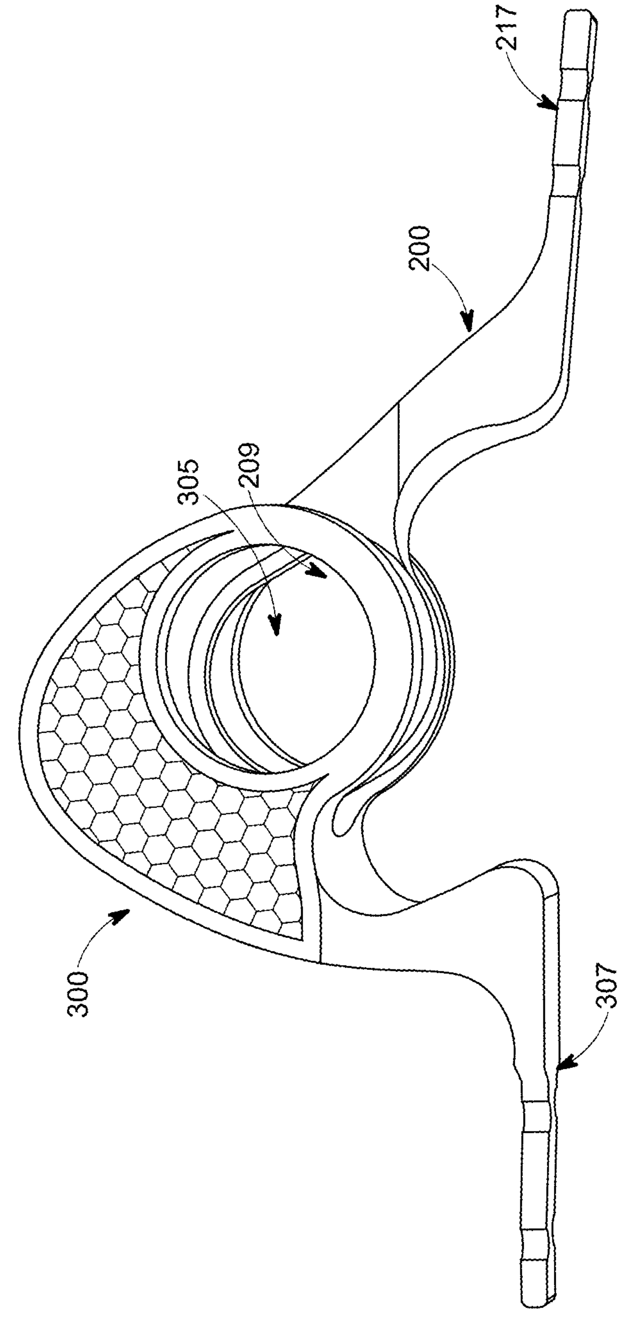
FIG. 3*b* illustrates the roller holder and roller housing fitted together in accordance with one or more embodiments of the invention.

FIG. 3*b* illustrates the roller holder and roller housing fitted together in accordance with one or more embodiments of the invention. In the example illustrated the roller holder fits inside a channel within the roller housing that allows the oval shaped side openings 209 to sit adjacent to the circular openings 305 so that both openings are abutted next to one another thereby providing a space for insertion of the roller unit.

Figure 4:
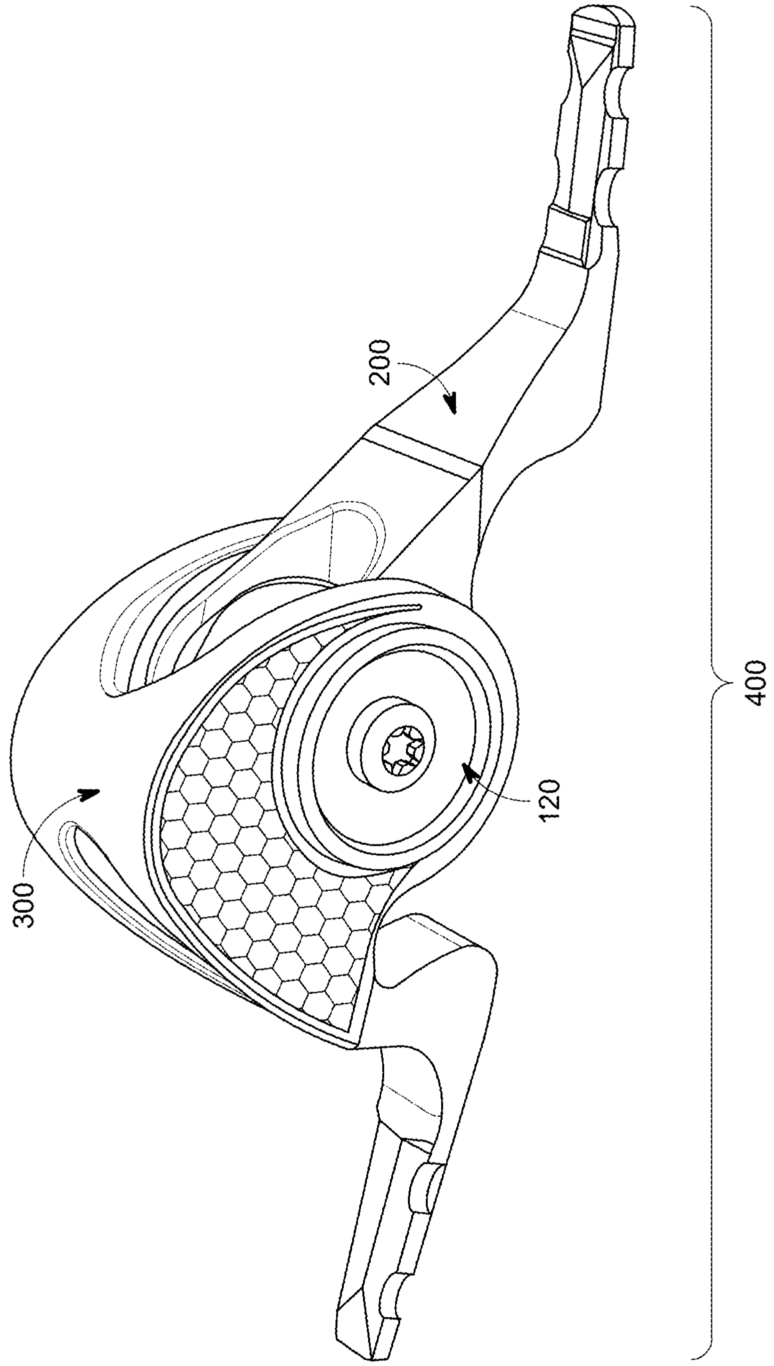
FIG. 4 illustrates an assembled roller guide containing the roller housing, roller holder and roller unit configured in accordance with one or more embodiments of the invention.

FIG. 4 illustrates an assembled roller guide 400 containing the roller housing 300, roller holder 200 and roller unit 120 configured in accordance with one or more embodiments of the invention. The roller unit 120 sits within the circular openings 305 of the roller housing 300 and the oval shaped openings 209 of the roller holder 200. This configuration enables the roller unit to travel within the oval shaped openings 209 when the fishing rod to which the roller guide is attached flexes from having a fish on the line.

Figure 5A:
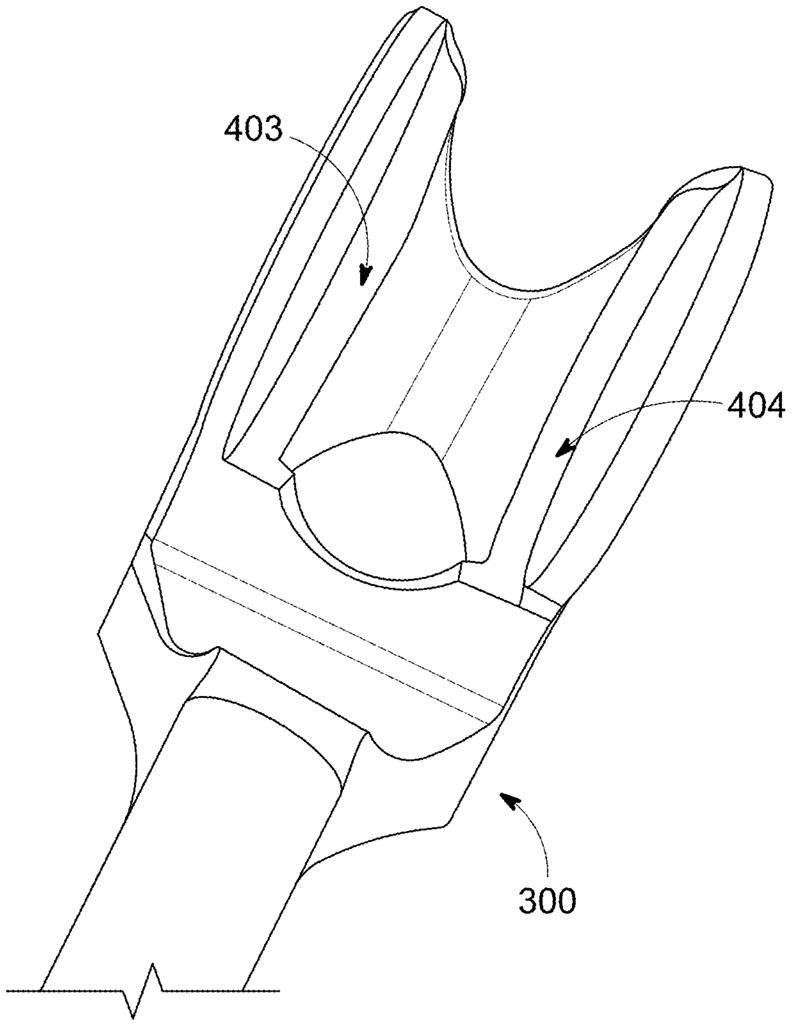
FIG. 5*a* illustrates a bottom view of the roller housing as it is configured in accordance with one or more embodiments of the invention.

FIG. 5*a* illustrates a bottom view of the roller housing 300 as it is configured in accordance with one or more embodiments of the invention. Indentations 403 and 404, which are both depicted in FIG. 5 sit within the roller housing 300 to provide space for the roller holder 200 to move as needed while keeping the roller unit 120 securely in place based on the amount of load placed on the line and fishing pole. The roller housing 300 has an indentation on each internal side within which the roller holder 200 fits.

Figure 5B:
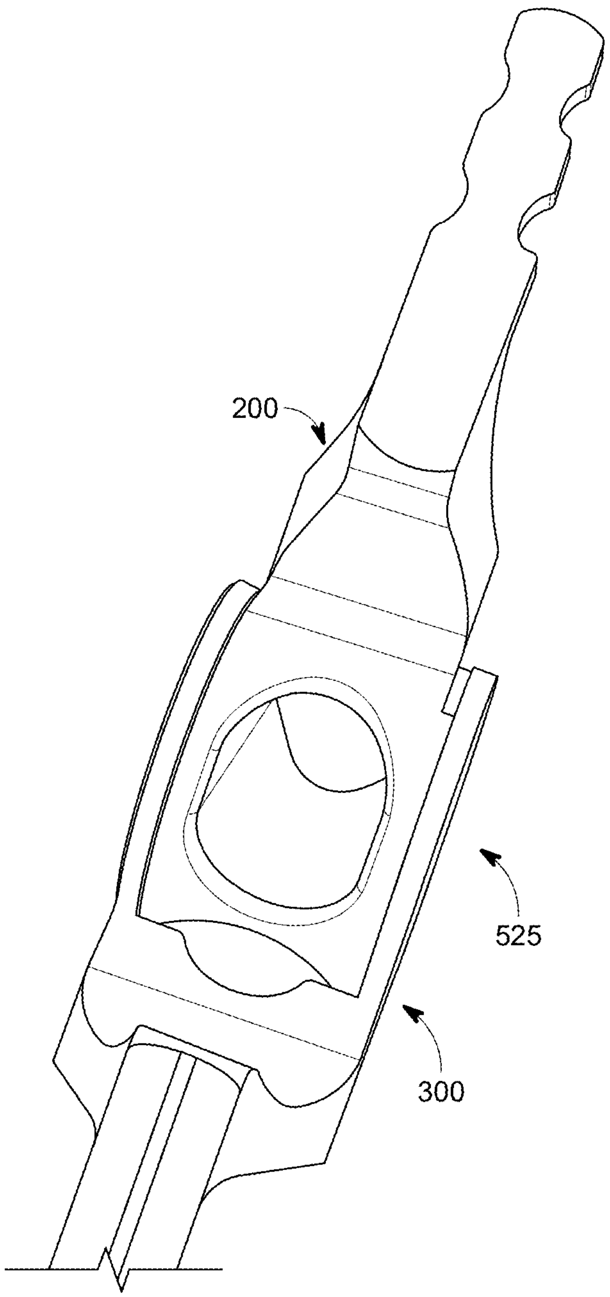
FIG. 5*b* illustrates a bottom view of the roller housing with the roller holder incorporated within.
Figure 5C:
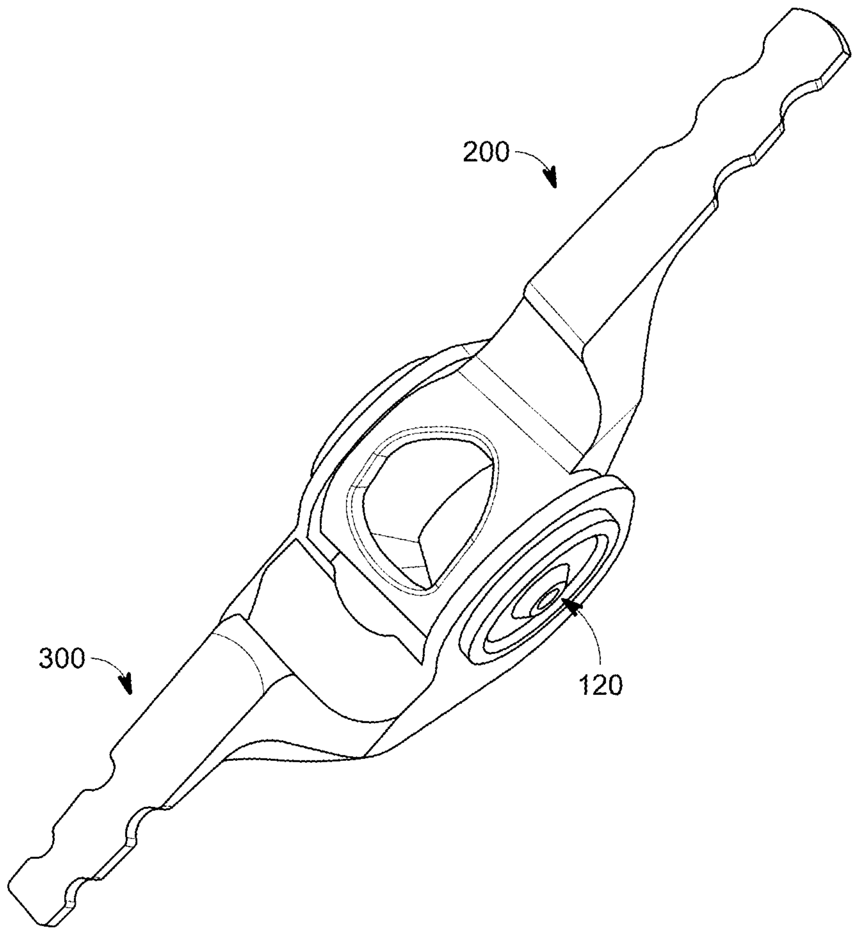
FIG. 5*c* illustrates a bottom view of the fully assembled roller guide with the roller housing, roller holder and roller unit components incorporated together in accordance with one or more embodiments of the invention.

FIG. 5*b* illustrates a bottom view of the roller housing 300 with the roller holder 200 incorporated within. The roller holder 200 fits within the indentations 403 and 404 to allow the roller unit 120 to be inserted through the circular openings 305 of the roller housing and the oval shaped openings 209 of the roller holder as indicated by arrow 525. FIG. 5*c* illustrates a bottom view of the fully assembled roller guide with the roller housing 300, roller holder 200 and roller unit 120 components incorporated together. This configuration allows movement of the roller holder 200 when the fishing pole flexes and thereby allows the roller guide to remain attached to the pole when the pole flexes under load.

Figure 6:
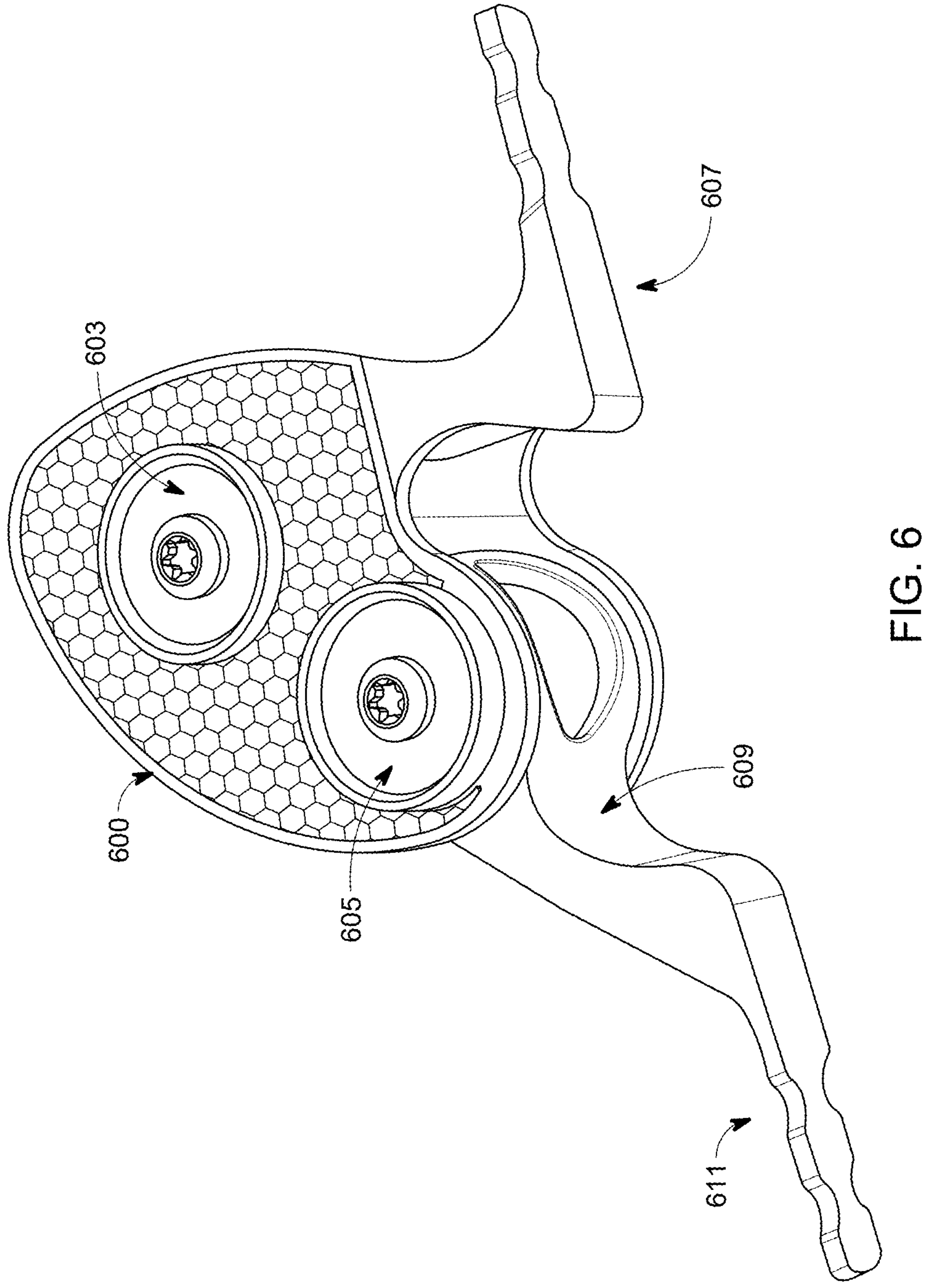
FIG. 6 illustrates an assembled roller guide wherein the roller housing contains multiple roller units within the housing in accordance with one or more embodiments of the invention.

FIG. 6 illustrates an assembled roller guide wherein the roller housing 600 contains multiple roller units 603 and 605 within the housing in accordance with one or more embodiments of the invention. A housing foot 607 extends from and is fixedly incorporated into the roller housing 600 as depicted. A roller holder 609 containing the roller unit 605 which is attached to oval shaped openings in the same manner discussed above is inserted into the roller housing 600. The roller unit 605 extends into the circular openings of the roller housing which keeps the unit in position while allowing movement of the roller holder 609 which can move because of the oval shaped openings. A second roller unit 605 sits above the other roller unit 605. This second roller unit 605 is mounted through circular openings in the roller housing 600 and sits in a fixed position. The roller holder 609 contains a housing foot 611 that is used to attach the roller holder 609 to the fishing pole. The roller guide configuration depicted in this FIG. 6 is typically mounted nearest the handle of the fishing pole and as a result of it having two roller units keeps the fishing line at a higher position near the handle. The roller guides having a single roller unit are mounted further down the fishing pole so that the fishing line extends from one end of the pole to the other end of the pole where is extends out an eyelet at the end of the pole. When these roller guides are used in conjunction with one another on a fishing pole the pole is able to flex as needed when under load and the roller guides are able to flex with it as the roller holder components of each roller guide is able to move sufficiently enough to handle the pole's flexibility.

To utilize the roller guides for purposes of fishing, a plurality of assembled roller guides are attached to the top portion of a fishing pole. The roller guide assembly having two roller units is typically positioned nearest the handle of the fishing pole and roller guides with a single roller unit are placed down the spine of the pole in evenly spaced increments. A fishing line extends from a reel attached at the handle end of the pole through each of the roller guides and then out an eyelet at the top of the pole. When the pole flexes due to a load being placed on the fishing line, the roller holders within each of the plurality of roller guides is able to move as a result of the oval shaped openings surrounding each roller unit.

Readers should note that the specific design depicted herein is not the only way in which the roller guide assembly described herein can be built. Other configurations will be evident to those of ordinary skill in the art and small design changes that retain the concepts set forth herein are considered feasible and well within the scope and spirit of the invention. As an example, while the roller holder 200 sits within the roller housing 300 a configuration that is vis versa, one where the roller holder is external to the roller housing is also feasible. In such a design variation, the oval shaped openings could then be moved to the roller housing itself or be kept on the roller holder. Similarly, the components of the roller unit may be separable as depicted for easy assembly or combined into a unit where some of all of the components are more permeably fixed together. Rivets, screws or any array of attachment elements may be utilized to secure the axels into the roller unit.

A roller guide system for adaptably holding a fishing line in place on a fishing pole when the pole flexes under load has thus been described. However, the claims and the full scope of their equivalents are what describe the invention and are to be construed in accordance with the plain and ordinary meaning that would be given to the terms set forth herein.

What is claimed is:

1. A roller guide for a fishing pole comprising:

a roller housing having a circular opening on each side of said roller housing and a housing foot that provides a platform for securing said roller housing to a fishing pole;

a roller holder having oval shaped openings on each side of said roller holder and a footing element for securing said roller holder onto said fishing pole, said roller holder being configured to couple with said roller housing;

a roller unit secured within said roller housing by extending through said circular openings of said roller housing and said oval shaped openings of said roller holder, said oval shaped openings leaving room for said roller holder to move when said fishing pole flexes from load placed on said fishing pole during use, said roller unit comprising a roller spool having a lateral center hole, said roller spool being circular on each end and tapering into a center channel for receiving a fishing line;

roller caps which sit on each end of said roller spool and have cap holes, said roller caps each having a cap flange extending beyond said circular openings of said roller housing to hold said roller caps in place within said circular openings;

a roller axel configured to extend through said cap holes and said lateral center hole of said roller spool; and axel caps which couple to said roller axel and permit said roller spool to spin freely around said roller axel.

2. The roller guide of claim 1, wherein said lateral center hole contains a center insert within which the said roller axel fits.

3. The roller guide of claim 1, wherein said axels caps utilize axel screws to secure said roller axel in said caps holes.

4. The roller guide of claim 1, wherein said roller housing comprises a second set of oval shaped openings on each side of said roller housing and a second roller unit secured within said second set of oval shaped openings.

5. The roller guide of claim 1, wherein said housing foot of said roller housing and said footing element of said roller holder are secured to said fishing pole with attachment elements.

6. A roller guide for a fishing pole comprising:

a roller housing having a circular opening on each side of said roller housing and a housing foot that provides a platform for securing said roller housing to a fishing pole;

a roller holder having oval shaped openings on each side of said roller holder and a footing element for securing said roller holder onto said fishing pole, said roller holder being configured to fit within said roller housing;

a roller unit secured within said roller housing by extending through said circular openings of said roller housing and said oval shaped openings of said roller holder, said oval shaped openings leaving room for said roller holder to move when said fishing pole flexes from load placed on said fishing pole during use, wherein said roller unit further comprises-;

a roller spool having a lateral center hole, wherein said lateral center hole contains a center insert within which a roller axel fits, wherein said roller spool is circular on each end and tapers into a center channel for receiving a fishing line;

roller caps which sit on each end of said roller spool and have cap holes, said roller caps each having a cap flange extending beyond said circular openings of said roller housing to hold said roller caps in place within said circular openings;

a roller axel configured to extend through said cap holes and said lateral center hole of said roller spool; and axel caps which couple to said roller axel and permit said roller spool to spin freely around said roller axel, wherein said axels caps utilize attachment elements to secure said roller axel in said caps holes.

7. The roller guide of claim 6, wherein said roller housing comprises a second set of oval shaped openings on each side of said roller housing and a second roller unit secured within said second set of oval shaped openings.

8. The roller guide of claim 6 wherein said housing foot of said roller housing and said footing element of said roller holder are secured to said fishing pole with said attachment elements.

9. A roller guide for a fishing pole comprising:

a roller housing having a circular opening on each side of said roller housing and a housing foot that provides a platform for securing said roller housing to a fishing pole;

a roller holder having oval shaped openings on each side of said roller holder and a footing element for securing said roller holder onto said fishing pole, said roller holder being configured to couple with said roller housing;

a roller unit secured within said roller housing by extending through said circular openings of said roller housing and said oval shaped openings of said roller holder, said oval shaped openings leaving room for said roller holder to move when said fishing pole flexes from load placed on said fishing pole during use, wherein said roller unit further comprises:

a roller spool having a lateral center hole, wherein said lateral center hole contains a center insert within which said roller axel fits, wherein said roller spool is circular on each end and tapers into a center channel for receiving a fishing line;

roller caps which sit on each end of said roller spool and have cap holes, said roller caps each having a cap flange extending beyond said circular openings of said roller housing to hold said roller caps in place within said circular openings;

a roller axel configured to extend through said cap holes and said lateral center hole of said roller spool; and axel caps which couple to said roller axel and permit said roller spool to spin freely around said roller axel, wherein said axels caps utilize attachment elements to secure said roller axel in said caps holes.

10. The roller guide of claim 9, wherein said roller housing comprises a second set of oval shaped openings on each side of said roller housing and a second roller unit secured within said second set of oval shaped openings.

11. The roller guide of claim 9, wherein said housing foot of said roller housing and said footing element of said roller holder are secured to said fishing pole with said attachment elements.

* * * * *